United States Patent [19]

Castelli

Best Available Copy

[11] E Re. 30,751

[45] Reissued Sep. 29, 1981

[54] TIDY BOX MADE ENTIRELY OF POLYPROPYLENE

[75] Inventor: Renato Castelli, Gent, Belgium

[73] Assignee: Samsonite Corporation, Denver, Colo.

[21] Appl. No.: 177,718

[22] Filed: Aug. 11, 1980

Related U.S. Patent Documents

Reissue of:

[64] Patent No.: 4,166,547
Issued: Sep. 4, 1979
Appl. No.: 943,362
Filed: Sep. 18, 1978

[30] Foreign Application Priority Data

Sep. 30, 1977 [BE] Belgium ..... 188333
Jun. 6, 1978 [BE] Belgium ..... 188346

[51] Int. Cl.[3] ..... B65D 43/14; B65D 51/04; B65D 1/24

[52] U.S. Cl. ..... 220/339; 220/20; 220/22

[58] Field of Search ..... 220/306, 307, 20, 22, 220/334, 337, 339, 331; 312/50

[56] References Cited

U.S. PATENT DOCUMENTS 3,127,225 3/1964 Oehrlein ..... 220/339 X
3,885,738 5/1975 Chesmel et al. ..... 220/331 X
4,108,310 8/1978 Alridge ..... 220/339 X

*Primary Examiner*—George T. Hall
*Attorney, Agent, or Firm*—George J. Netter

[57] ABSTRACT

A tidy box made entirely of polypropylene consists only of two parts fitted together after moulding. One part, the lower part, forms the base of the box together with a lid provided on one side with a catch or fastening lug and on the other side with a pull handle. The lid is made integral with the base by a polypropylene hinge so that the whole forms a single piece. The other part, the upper part, forms side parts, a top, back and front, the latter forming a fixed frame for the lid without any bottom cross-member, and the top has a notch and retaining edge for co-operating with the lid catch or fastening lug, the whole again forming only a single piece.

10 Claims, 13 Drawing Figures

TIDY BOX MADE ENTIRELY OF POLYPROPYLENE

Matter enclosed in heavy brackets [ ] appears in the original patent but forms no part of this reissue specification; matter printed in italics indicates the additions made by reissue.

BACKGROUND OF THE INVENTION

The present invention relates to a tidy box suitable for keeping small items, for example office requisites such as pencils, pens, rubbers, and pocket calculators, small samples and small toilet and dress requisites. In preferred embodiments the box is especially designed to be fitted inside and to be secured to the back of the lid of a rigid type of case, such as an attache case, generally used for carrying documents.

Although there already exist boxes which can be used for this purpose, the present invention provides an improved form of tidy box which permits simple manufacture and which can have a high strength in use.

SUMMARY OF THE INVENTION

A tidy box in accordance with the invention, suitable for keeping small items, for example office requisites such as pencils, pens, rubbers, and pocket calculators, small samples and small toilet and dress requisites, is made entirely of polypropylene and consists only of two parts fitted together after moulding, one part, a lower part, forming the base of the box together with a lid having a catch or fastening lug on one side and a pull handle on the other side, the lid and the base being integrally connected by a polypropylene hinge so that the whole of said lower part constitutes only a single element, and the other part, an upper part, forms side portions, a top, back and front portion, the latter forming a fixed frame for the lid without any bottom cross-member, and the top having a notch and retaining edge, the whole of said upper part again constituting only a single element.

In preferred embodiments, as the tidy box will generally extend across the whole width of the lid of a case with which it is used, provision is usually made for dividing it up into several compartments with partitions formed simultaneously with the upper part, and the lower part then has several lids, one per compartment.

BRIEF DESCRIPTION OF THE DRAWINGS

To provide a clearer understanding of the invention a description is given below with reference to the accompanying drawings illustrating, by way of non-limitative example only, a tidy box made in accordance with the invention and having three compartments.

In said drawings.

DESCRIPTION OF THE PREFERRED EMBODIMENT

Figure 1:
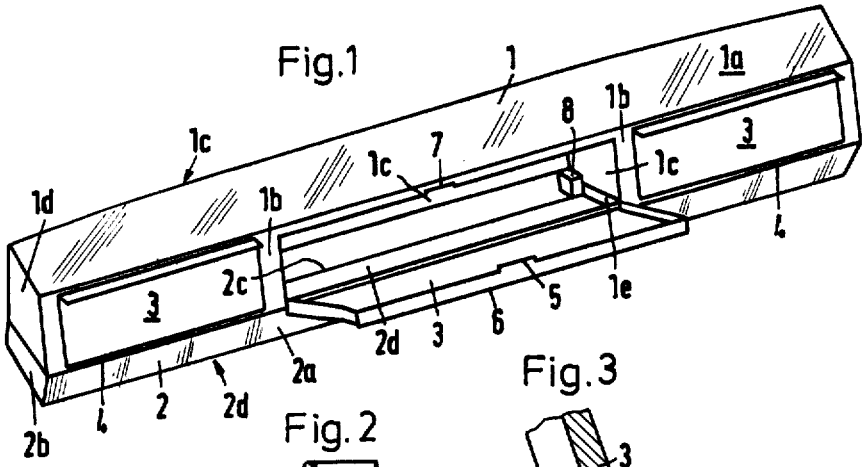
FIG. 1 is a general diagrammatic view of the tidy box.

Referring to the various FIGS. of the drawings, the upper part of the box structure illustrated therein is indicated generally by the reference numeral 1 and the lower part of the box structure, which includes a number of lids 3 for different compartments, is indicated generally by the reference numeral 2.

The upper part 1 incorporates a top portion 1a, a front portion 1b, a rear portion 1c and end portions or sides 1d. The lower part 2, which provides the base of the box in addition to the lids 3, incorporates a front base portion 2a, end or side base portions 2b, a rear base portion 2c, and a base surface or bottom portion 2d, these portions together forming a trough-like container.

In the case of a box with three compartments as illustrated, the lower part 2 is further provided with internal base portions 2e so that there are in effect three trough-like containers, and the upper part 1 has internal partitions 1e.

Figure 2:
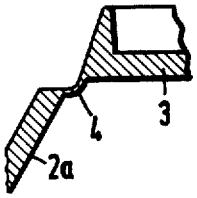
FIG. 2 is a fragmentary view, on an enlarged scale, at hinge level with the box open.
Figure 3:
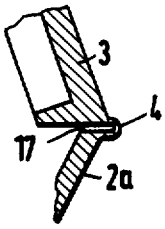
FIG. 3 is a view similar to FIG. 2 but with the box closed.

Referring more particularly to FIGS. 2 and 3, it will be seen that connecting hinges 4 between each lid 3 and the front base portion 2a of the lower part 2 are formed simply by an integral bridging section of polypropylene having a reduced thickness and bent round at the front permitting each lid to swing open through at least 90° (see FIG. 2). The lids 3 also each have a catch or fastening lug 5 and a finger pull handle part 6, and for engaging with the catch or fastening lug 5 the front portion 1b of the upper part 1 has a notch 7 in an upper retaining edge.

Figure 4:
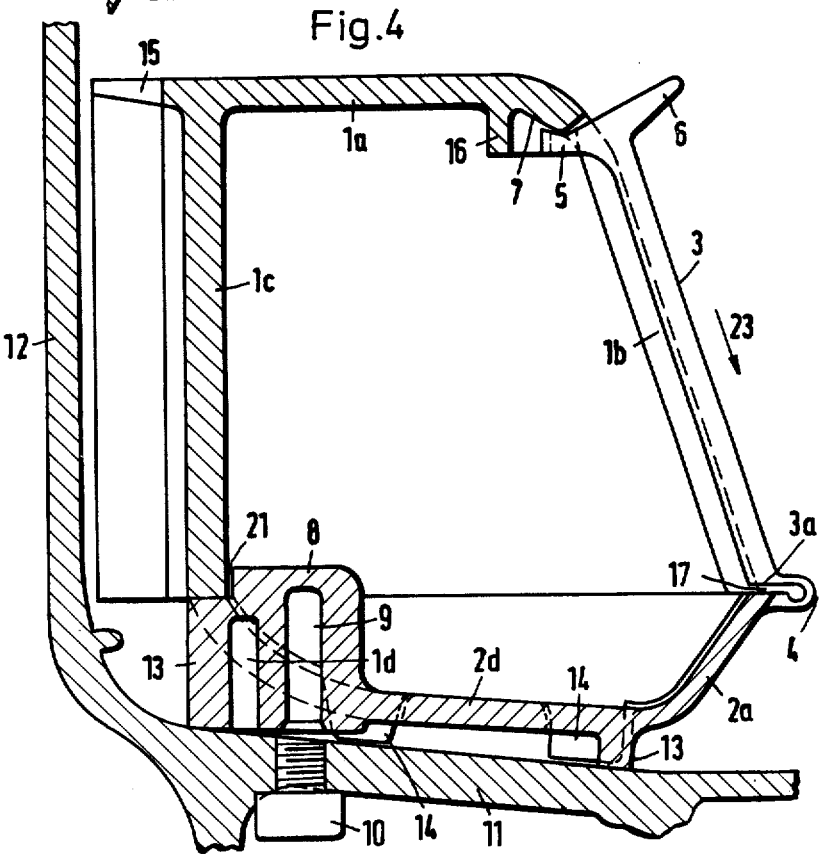
FIG. 4 is an enlarged side view in vertical section of the box fitted in the lid of a case, the section being taken at the level of a fixing point.
Figure 5:
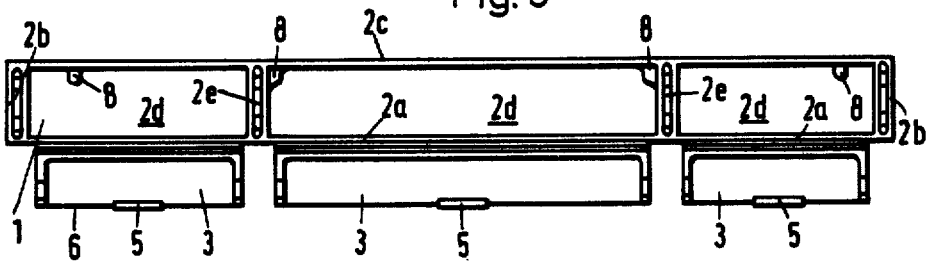
FIG. 5 is a top plan view of the lower part of the box, with the lids thereof open.
Figure 6:
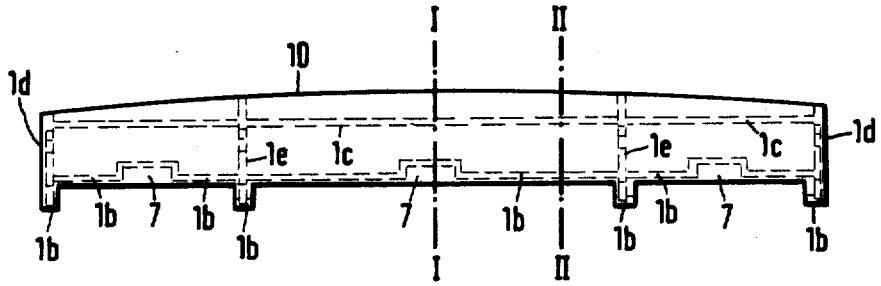
FIG. 6 is a top plan view of the upper part of the box.

By referring to FIG. 4, the precise cross-sectional profile of the catch 5, pull handle 6 and notch 7 is seen, and the longitudinal shape of these elements is seen by reference to FIGS. 5 and 6. Thus, as shown, each catch 5 extends over only the centre section of the respective lid 3 and each notch 7 extends over only the centre section of the front portion 1b associated with each respective compartment, but on the other hand the pull handles 6 each extend along the whole length of their respective lids 3. From other structural details shown in FIGS. 4 to 8, it will be seen that the base or lower part 2, of which the front portion 2a is curved and inclined outwards, projects forwards beyond the front edge of the top portion 1a of the upper part 1 so that each lid 3, when closed, is inclined inwardly.

At each of at least two fixing points 8, as shown in FIG. 4, a hole 9 is provided in the base bottom portion 2d, extending inwards from the outside, for receiving a "Parker" screw 10 to fix the box to an attache case by passing the screw 10 through a side wall 11 of the lid of the case. The case is only partially illustrated, by this side wall 11 of the lid and by another wall 12.

Figure 7:
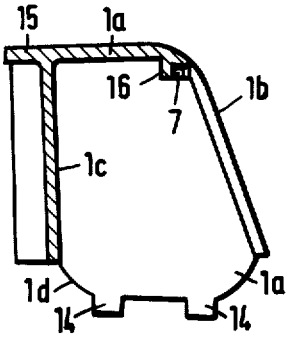
FIG. 7 is an enlarged side view in section taken on the line I—I of FIG. 6.
Figure 8:
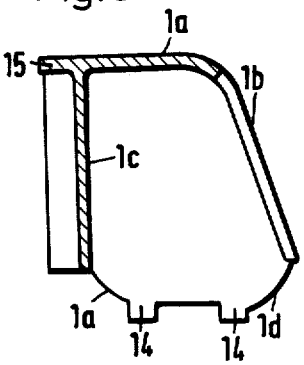
FIG. 8 is an enlarged side view in section taken on the line II—II of FIG. 6.
Figure 9:
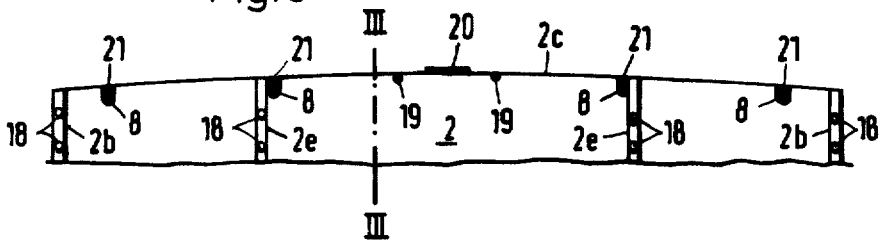
FIG. 9 is a further, fragmentary, top plan view of the lower first part.
Figure 10:
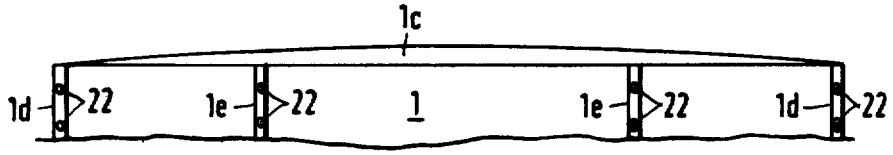
FIG. 10 is a fragmentary underside plan view of the upper second part.

In order to seat the box perfectly in the top of the case, abutment cross-members 13 are provided on the underside of the base bottom portion 2d and, on the upper part 1, feet 14 are provided at the bottom of the sides 1d together with an abutment cross-member on the rear portion 1c (see FIGS. 7 and 8).

As seen in FIG. 4, there is also a cross-member 16 behind the notch 7 forming an abutment or stop which prevents the lid 3 from being pushed in too far within the box. As is also seen in FIG. 4, the hinge 4 is formed with a portion which is sufficiently thin as to leave an open space or gap 17 between the lower edge 3a of the lid and the free edge of the front base portion 2a so as to permit lowering of the lid in the direction of the arrow 23 thereby to release the catch 5 from the notch 7.

Due to the upwards inclination of the pull handle 6, which arises partly from the opposite inclination of the lid 3 (in the closed position), when a pull is exerted to open the lid a lowering of the lid in the direction of the arrow 23 tends to be produced quite naturally.

Figure 11:
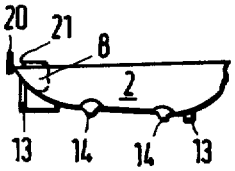
FIG. 11 is a fragmentary enlarged side elevational view from the end of FIG. 9.

Referring now to FIGS. 9 to 13, it is seen that in a preferred form the lower part 2, in the base side portions 2b and dividing portions 2e, includes openings 18 extending through or associated with feet 14 and forming mortise apertures which may act as sockets. Also, there are two support points 19 positioned at and rising above the outer wall, on the inside thereof, of the rear base portion 2c and a support member 20 positioned at and rising above the outer wall, on the outside thereof, of the rear base portion 2c (FIG. 11).

In this example, only two support points 19 are provided since there is also a support surface 21 provided by the fixing parts or portions 8 also positioned at and rising above the outer wall, on the inside thereof, of the rear base portion 2c.

In the upper part 1, each of the side portions 1d and interior partition portions 1e are provided with tenons 22 designed to be introduced into the mortice apertures 18.

Consequently, on the one hand the two parts 1 and 2 are fitted together by the arrangement of the tenons 22 and mortise apertures 18 and, on the other hand, the rear portion 1c of the upper part is held and supported between one side of the support member 20 and the other side of the support points 19 and the part 21 of the fixing points 8.

Figure 12:
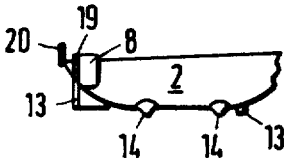
FIG. 12 is a fragmentary enlarged side view in section taken on the line III—III of FIG. 9.
Figure 13:
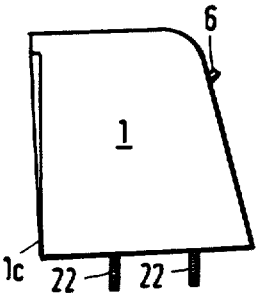
FIG. 13 is an enlarged side elevational view from the end of FIG. 10.

As the box is made in polypropylene, the two parts 1 and 2 can be positively joined together in a known manner by welding in fixing the tenons 22 in the feet 14 which, as indicated in FIGS. 11 and 12, will thereby be flattened.

The invention is not of course limited to the embodiment described and illustrated and it would not be outside the scope of the invention to make detail modifications in presentation and form, for example, in the covering of the box or in its interior fittings, a characteristic feature being that the box is made of only two parts each moulded all in one piece without using any mechanical accessories such as screws, fastenings, hinges, springs, rubber bands, etc.

I claim:

1. A tidy box made entirely of polypropylene suitable for keeping small items, for example office requisites such as pencils, pens, rubbers, and pocket calculators, small samples and small toilet and dress requisites, said box consisting only of two parts fitted together after moulding, one part, a lower part, forming the base of the box together with a lid having a catch or fastening lug on one side and a pull handle on the other side, the lid and the base being integrally connected by a polypropylene hinge so that the whole of said lower part constitutes only a single element, and the other part, an upper part, forms side portions, a top, back and front portion, the latter forming a fixed frame for the lid without any bottom cross-member, and the top having a notch and retaining edge, the whole of said upper part again constituting only a single element.

2. A tidy box according to claim 1, characterised in that it is divided into a plurality of compartments with partitions formed simultaneously with the upper part, and the lower part has a plurality of lids, one per compartment.

3. A tidy box according to claim 1, wherein the hinge is formed by a polypropylene portion of reduced thickness bent round externally.

4. A tidy box according to claim 1, wherein the front portion of the base of the box is inclined outwardly and projects beyond the top edge of the box such that the lid, when closed, is inclined inwardly.

5. A tidy box according to claim 3, wherein the hinge is formed by a portion of which the thickness is reduced sufficiently to leave a gap between the lower edge of the lid and the edge of the front portion of the base such as to permit the lid to drop and release the catch from the notch.

6. A tidy box according to claim 1, wherein the pull handle is inclined upwardly in relation to the lid such that, when pulled, there is a natural tendency for the lid to be lowered.

7. A tidy box according to claim 1, said box including a number of external abutment cross-members and feet facilitating it being seated in close fitting relationship in the top of a case and including, behind the notch, an internal cross-member forming an abutment for the catch.

8. A tidy box according to claim 1, wherein the base has externally at least two fixing points comprising holes adapted to receive screws for fixing the box in the top of a case.

9. A tidy box according to claim 1, wherein, for connecting together the opposite two parts, side portions and dividing portions of the base include holes which are associated with feet and form mortise openings, and support elements are provided comprising support points and also support surfaces of fixing portions, which are positioned at and which rise above an outer wall, on the inner side thereof, of the rear portion of the base, and a support member which is also positioned at and which rises above the outer wall, on the outer side thereof, of the rear portion of the base, and the side portions and interior partition portions of the upper part have tenons adapted to be engaged in the mortise openings of the base while the back portion of the upper part fits between said support elements of the base.

10. A tidy box according to claim 9, wherein the tenons of the upper part are welded in the mortise openings of the base of the lower part.

* * * * *